March 16, 1937.　　W. A. RICE ET AL　　2,074,027
METHOD AND APPARATUS OF WEAVING KNOTTED FABRICS
Filed Jan. 31, 1933　　6 Sheets-Sheet 1

Inventors
Walter A. Rice
Frank G. Shinn,
By
Attorneys.

Witness:

March 16, 1937. W. A. RICE ET AL 2,074,027
METHOD AND APPARATUS OF WEAVING KNOTTED FABRICS
Filed Jan. 31, 1933 6 Sheets-Sheet 4

March 16, 1937.  W. A. RICE ET AL  2,074,027
METHOD AND APPARATUS OF WEAVING KNOTTED FABRICS
Filed Jan. 31, 1933  6 Sheets-Sheet 6

Inventors
Walter A. Rice and Frank G. Shinn
Attorneys

Patented Mar. 16, 1937

2,074,027

UNITED STATES PATENT OFFICE 2,074,027

METHOD AND APPARATUS OF WEAVING KNOTTED FABRICS

Walter A. Rice, Yonkers, and Frank G. Shinn, Bronxville, N. Y.

Application January 31, 1933, Serial No. 654,468

26 Claims. (Cl. 139—5)

Our invention relates to the weaving art and in particular to the insertion of tufts or knots between and about the warp threads of a woven fabric with very close warp thread positions.

One purpose of our invention is to form a shed position having pairs or sets of warp threads alternately in the same active shed position, to cross the warp threads in the active position, to apply tufts to the crossed warp threads, and to complete the loops or knots on the alternate pairs or sets of warp threads in the same shed for one set of tufts, forming a second shed whose warp threads are subsequently crossed and to which tufts are applied after these warp threads have been crossed within the intervening pairs or sets of warp threads.

A further purpose is to form active sheds of alternating pairs or sets of active warp threads, intervening pairs or sets forming idle warp threads, respectively, in order to give lateral room for warp thread crossing notwithstanding minimal warp thread spacing, to cross the warp threads and to introduce tufts from one side to the other of the crossing and use the straightening out of the warp threads after crossing to place the tufts in position.

A further purpose is relatively to displace alternate pairs or sets of warp threads, which are to be active, from intervening warp threads which are to be inactive or idle and to introduce tuft yarn within the shedded pairs or sets while they are shedded, completing the tuft introduction, ready for beating up, while the shed is maintained.

A further purpose is to cross the individual warp threads of alternate pairs or sets of warp threads, to insert tufts within the warp threads after they have been crossed, thereafter to release from their crossing the warp threads which have been crossed within the alternate pairs or sets, by which releasing knots are then formed because of the straightening out of the crossed threads and subsequently correspondingly to treat the intermediate pairs or sets of warp threads, beating the two pairs or sets up together and supplying the necessary weft shots before the next tufting.

A further purpose is to place tuft yarn upon alternate pairs or sets of warp threads in a fabric by manipulation of the tuft yarn and before cutting the tufts, controlling their uniformity of tuft length by holding the uncut ends until the tuft is completed.

A further purpose is to form tufts or knots upon alternate pairs or sets of warp threads close to the fell and subsequently to form tufts or knots upon the intervening pairs or sets of warp threads close to the fell, and to control the position of the tufts by manipulation of the cut and uncut ends of the tufts up to the point where they are ready to be beaten up, inserting weft appropriately.

A further purpose is to form tufts or knots in alternate pairs or sets of warp threads simultaneously across the fell, maintaining hold on one, and, preferably, on both ends of each of the tufts up to the time of completion of the tufts at the fell and subsequently to form tufts or knots upon the intervening pairs or sets of warp threads simultaneously across the fell, likewise maintaining hold on both ends of each of the tufts until the tufts are completed ready for beating up, to insert one or more shots of weft and to beat up both or all sets of tufts or knots together or separately prior to repeating the operation.

A further purpose is to throw selectively adjoining warp threads individually or arranged in pairs or larger groups, into upper and lower positions, those in the upper positions forming a shed, to insert tuft loops or knots in the warp threads in the one position and to re-align the warp threads into different upper and lower warp thread areas in a shed and insert tuft loops or knots on the warp threads thus made available, preferably but not necessarily bringing all of the warp threads which were not used in the first shed arrangement into position for tuft loop or knot insertion in the second or a subsequent formation.

A further purpose is to tuft or knot alternate pairs or sets of warp threads simultaneously across the fell by tube, gripper or tube and gripper means and subsequently in the same way to form intermediate tufts or knots in the intervening pairs or sets of warp threads simultaneously, holding fast to each of the tufts or knots at both ends until the tufts or knots are placed at the fell and inserting one or more shots of weft prior to repeating the operation.

We have preferred to illustrate our invention by one main form with several variations of different suggested types of tuft loops or knots which can be used, selecting a form which is practical, effective and highly desirable but which at the same time has been selected chiefly because of the clearness with which it illustrates the invention.

Figure 5 is an enlarged top plan view of a multiple of tufts arranged in accordance with the method of knot placement, as shown in Figure 3 and showing a second set of tufts being placed on intervening pairs of warp threads.

Figure 5a is a view similar to Figure 5, showing a second set of tufts or knots formed and forced in place between the first set of tufts or knots and bound in place with two shots of weft thread.

Figure 6 is a view in perspective showing the relation of the parts as shown in Figure 3, differing from that of Figure 5 in that the second set of tufts is omitted.

Figure 7 is a cross-section of two warp threads with a Turkish knot formed about them.

Figures 8 and 8a are sections showing right and left forms of Persian knots (also sometimes called "Sehna" knots) formed on a pair of warp threads.

Figures 8b and 8c are sections showing left and right forms of Persian knots formed on three warp threads each.

Figure 9 is a perspective view showing right and left knot formations in successive rows or courses.

Figure 10 is a cross-section of two warp threads with a plain tuft formed about them.

Figure 11 is a cross-section of a tuft or knot bridging three warp threads.

In the past it has been difficult to weave tufted or knotted pile fabrics of fine pitch where the tufts have been formed as such (distinguishing from plush or velvet woven face-to-face) about warp threads. Due to the mechanical limitations of the looms, the finest pitches obtainable in commercial looms of this type at the present time are seven knots or fourteen tuft ends to the inch of width, which warp spacing is referred to herein as normal pitch. We have made it possible to tuft warpage of much finer pitch than this normal pitch, for example of half the pitch (fourteen warp threads) to the inch or even finer pitch.

We have discovered that a complete warpage of warp threads too closely spaced for machine tuft insertion can be encircled by Persian knots, for example, by the simple expedient of shifting, preferably depressing part of the warpage at each time of knot insertion, while the remaining warpage, arranged pair by pair or group by group can be used to facilitate tuft or knot insertion because the adjoining warp threads are not in the way. After the tufts or knots have been inserted, that portion of the warpage which was depressed can be raised and made accessible for tufting by depression of the warp threads previously tufted.

The warpage may be divided in half or in thirds according to the proportion to be retained on the surface, but the result can be secured also by splitting up the warpage into groups of two or three adjoining warp threads and then depressing two or three or a multiple of two or three, according to the fineness of pitch sought, and so on according to the number of warp threads which are intended to be surrounded by a single tuft and the number of shed formations and tuft insertions required to tuft the entire warpage, preferably treating the sets alternately or in a repeated sequence.

The division of the warp threads into spaced pairs, sets, or groups, is most conveniently effected by placing the threads to be provided with tufts in the upper warpage of a shed, and those which are not to be tufted at this time at a lower level and shifting all or a part of the lower warp threads up (and shifting those first acted upon down) for the next tuft insertion.

It will ordinarily be desirable to pair or group the same warp threads together for each tuft insertion within or about any of these threads, but this is not essential, as one or more warp threads may be grouped with a different thread or other different warp threads in successive formations of the shed.

A large proportion of the use of my invention will undoubtedly take place in warp thread spacings which can be handled readily by depressing alternate pairs, or alternate groups of three of the warp threads, while the intervening pairs or groups are acted upon so that but two main sheds will be required to apply all of the knots for a course.

By our improved method we thus introduce a second set of tufts or knots between each two knots of normal pitch, thereby producing a rug having twice the fineness of normal pitch, or, if desired, a third set of warp threads can be introduced and thrice the fineness of normal pitch can be obtained. It is possible to introduce more than a third set of tufts or knots, but in this event a coarser pitch of warp threads would originally be chosen to permit the insertion therebetween of more than two additional sets of knots or tufts.

As an example, if a seven tube frame be originally chosen and a second set of knots later introduced, it would result in a "warp pitch" of fourteen knots or twenty-eight tuft ends in each inch of width in the weave.

If a seven tube frame be originally chosen and a second and then a third set of knots later introduced, it would result in a "warp pitch" of twenty-one knots or forty-two tuft ends in each inch of weave.

In practice, if more than a third set of knots be introduced a five tube frame would in all probability be used and the knots would then be counted in multiples of five, the tuft ends always being double the number of knots.

Figures 5, 6, 7, 8, 9, 10, 11:
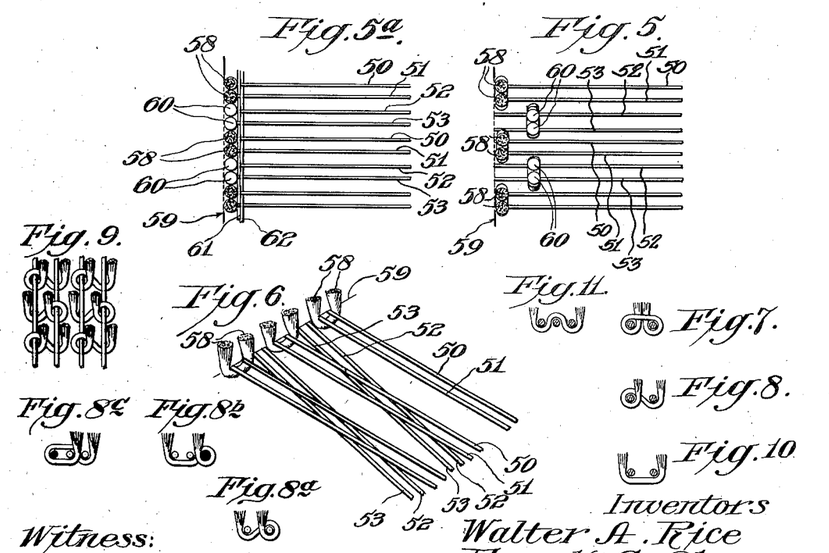

In the illustrations we have confined ourselves for the sake of clearness to showing the introduction of but one additional set of tufts or knots, and the finest normal pitch of weaving of this character, in the past, is indicated in Figure 5.

It will be understood that the operations or beats of the reed will equal in number the number of rows of tufts or knots introduced.

Figure 1:
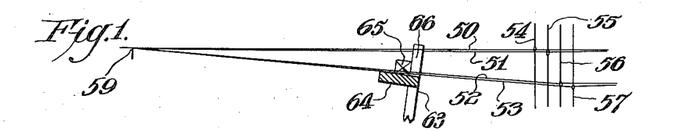
Figure 1 is a diagrammatic view in side elevation of two pairs of warp threads in their relative positions for the forming of a tuft or knot in or about one pair.

In Figure 1 we have illustrated identical warp threads comprising threads numbered 50, 51, 52 and 53 for convenience in reference to them, formed partly in a shed. The warp threads 50 and 51 are held by their respective heddles 54 and 55 in shed position, while the warp threads 52 and 53 are held in a lowered position and out of action by their respective heddles 56 and 57.

While the warp threads are here shown slightly out of line, this is done in this view merely for clearness; in actual practice those represented to be at the level or weaving point are in exact alignment, and those represented to be in their lowered position (while being held out of action) are also in alignment.

Figure 2:
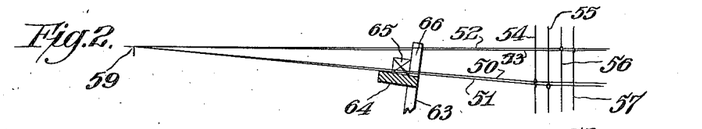
Figure 2 is a similar view with the warp threads in position for the forming of a tuft or knot in or about a second (here the other) pair.

In Figure 2 we show a reversal of the heddles and of the warp threads, the heddles 56 and 57 having been moved up, bringing the warp threads 52 and 53 to the level position, and the heddles 54 and 55 having been lowered, carrying down the warp threads 50 and 51.

Figure 3:
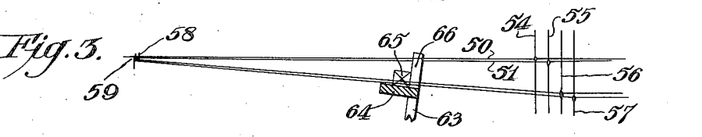
Figure 3 is a view similar to Figure 1 with the warp threads in position at which the first tufts or knots are beaten up.

Figure 3 is a view similar to Figure 1 but the first set of tufts or knots 58 is shown as surrounding the warp threads 50 and 51. The tufts have been moved or "beaten up" to the fell 59.

Figure 4:
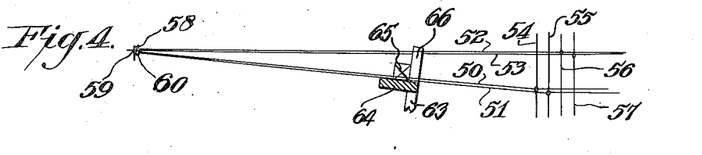
Figure 4 is a view similar to Figure 2 with the warp threads in position at which the second tuft or knot is beaten up and a shot or shots of binder or weft thread is or are placed.

Figure 4 shows the second set of tufts or knots 60 positioned upon the warp threads 52 and 53, and moved up to a position between adjoining pairs of the first set of tufts or knots 58. It is in this position the weft threads 61, 62 are "shot" into place in back of the tufts.

We employ a lay 63 of usual type having a lay bed 64 for the support of a shuttle 65 and carrying reed dents 66, all of which are common and well known in this art.

In Figure 5, in top plan view, the warp threads are shown with the tufts or knots of the first set beaten up and with the tufts or knots of the second set formed but not beaten up to position, whereas in Figure 5a not only have the tufts or knots been beaten up, but two weft shots have been inserted in different shed positions.

From Figure 5 and 5a it will be apparent that after the introduction of the tufts or knots upon all of the warp threads, the threads of the pairs are no longer treated as forming pairs or the threads of the sets as forming sets, but all of the warp threads with their tufts or knots meet at the fell, and all of the tufts or knots are there aligned to form a course. By our invention we are thus enabled to form a course of very closely and compactly arranged tufts or knots about warp threads placed much more closely together than the warp threads could be placed without the use of our invention.

It will also be evident from Figure 5a that the weft threads bind in or consolidate the individual courses of tufts or knots, and that, considered longitudinally of the warp thread, the concentration of tufts or knots would be greater if a single weft thread only be used between each two courses of tufts or knots than if a plurality of weft threads be used. Our invention obviously is not dependent upon this feature of the number of weft threads which are applied to bind in, and which at the same time thus separate the several courses of tufts or knots.

Though we have emphasized the suitability of our invention to facilitate machine rug manufacture because the additional spacing at the sides of the warp threads about which knots are to be formed is much needed if machine operation is to be practicable with a low pitch warp thread spacing, it will be obvious that by our invention hand rug manufacture can be effected much more quickly and with much more ease and accuracy than by previous methods.

In Figure 6 a perspective is shown corresponding with the position of Figure 3, in that tufts or knots have been applied to the pairs of warp threads in the shed and intervening pairs of warp threads are seen in the lower level below the shed.

In Figures 7 to 11, inclusive, suggested forms of tuft, loop or knot are shown. The knot of Figure 7 is Turkish whereas those of Figures 8, 8a, 8b, 8c, and 9 are Persian and that of Figure 10 is a plain loop similar to that used in Axminster weave, but made about the warp threads instead of about the weft threads.

The knots of Figures 8b, 8c and 11 differ from the other knots in that they include three warp threads each instead of two each in the other knots.

We recognize that our invention may be carried out by various different types of knot and by a wide variety of means for tying the knot, providing other characteristics of our invention, as set forth, are utilized; in particular provided the spacing between the warp threads be accentuated by removal of some of the warp threads from the shed position in which the tufts are applied so as to give additional lateral spacing for warp thread shifting in crossing, or for otherwise facilitating the introduction of the tufts of knots.

As indicated, the best form of this known to us lies in the alternate location of pairs of warp threads in different shed positions so that the spaces occupied normally by the idle warp threads are vacant in the active warp thread shed position, giving additional lateral room for operating upon the active warp thread pairs or sets.

We show in the present application a number of methods and means of applying tufts, without attempting a complete showing, for the purpose of increasing the breadth of interpretation by showing the applicability of different tufts or loops with the same or different spacing and methods and mechanisms for knot insertion.

In all of our forms the tufts or knots are formed about pairs or groups of warp threads in front of the reed, that is between the reed and the fell. We find that the best results require that the tuft or knot be formed close to the fell. The warp threads may thus remain in the reed at all times.

In Figures 12 to 29, 34 and 41 to 43b one method and one mechanism of tuft introduction have been shown applied to alternate pairs of warp threads in an upper active shed position, the shedding being altered slightly during the operation to facilitate lateral movement of one of the warp threads of each pair by means, here a tube, to effect the crossing, reverse lateral movement being used to make the crossing central with respect to the normal position of the two warp threads of each pair.

The tube here is one form merely of a tool by which the tuft yarn is introduced between the crossed warp threads of the pair and is carried from the rear of the crossing (as seen in these figures) to the front of the crossing of the pair close to the fell.

In all of these figures a tube 67 is shown as carrying a tuft yarn 68 which is the normal Axminster tuft yarn. The tube in these figures is curved whereas the Axminster tube is normally straight.

Because of the necessity for providing additional room between the warp threads close to the fell for the insertion—in some of the forms—and here for the emergence of the tuft yarn carriers, and because of the desirability of giving as much room as may conveniently be given for insertion of the tuft yarn carriers downwardly between the threads of the warp pairs at a distance from the fell, permitting an increase of the number of warp threads per inch, which can be tufted, a comb 69 is used to space the warp threads close to the fell. (See particularly Figures 34, 41–43b.)

The comb 69 is provided with teeth 70 corresponding in number to one tooth for each tuft yarn carrier—in this illustration one tooth for each tube, and for each two sets (that is two pairs) of warp threads. This spacing corresponds also with the lateral spacing occupied by two dents of the reed.

The comb teeth 70 are separated by comb spaces 71 within which alternately lie the warp threads. This position is very close to or at the fell. The outer faces of the comb teeth are provided with sloping (guiding) surfaces 72.

Preferably the guiding surfaces do not extend all the way from the one slot side 73 to the other slot side 73' but stop at some point 75 so that on each tooth a top flat surface 76 will be presented to engage and lift one of the warp threads which is to be operated upon in the effective set (here pair). This is done for the double reason that a flat surface here is more reliable in selecting the correct warp thread at this point—as compared with a sharp edge which might pass between the wrong adjoining warp threads—and because by this means a warp thread lifted is made the highest warp thread in the slot 71. Though this last is not of much importance it is desirable.

As the comb is withdrawn and is introduced afresh for each shift in warp shed position the comb can be shifted lengthwise as desired in order to have each flat 76 lie under, and therefore lift the proper warp thread. This is important because the warp thread lifted should be not only one of the pair in the active warp thread shed but the border thread of the group which is to occupy a comb slot. The two warp threads of the active pair preferably occupy the highest and next to the highest positions in the corresponding slot between the teeth of the comb.

The capability of shifting the comb lengthwise is indicated by the arrow 77 with the purpose and intent that the comb may be shifted and retracted as desired, not only for the purpose of insuring accurate shed position (which will vary slightly with the weight of tuft material inserted and other operating conditions so as to reliably separate the warp threads at the right place for the pairing or "setting" selected) but also in order, when desired, to use this means to guide the warp thread lifted into the proper slot between the comb teeth and to shift the comb when the shedding is altered.

The use of the shifting of the comb to deposit the warp thread lifted by each comb tooth in the proper comb slot is alternative to the shifting of the warp thread into its comb slot by lateral movement of the shifted warp thread of the raised pair or set as explained at more length hereafter.

The shifting of the comb upwardly and downwardly to insert it within the warp threads or to withdraw and thus first to divide the warp threads and to withdraw from them is indicated on the drawing by the arrow 78.

Figures 41, 41A:
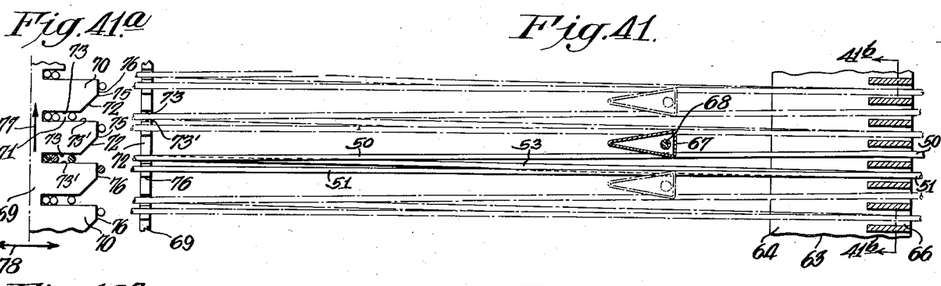
Figures 41, 42 and 43 are fragmentary enlarged top plan sectional views for illustrative purposes.
Figures 41a, 42a and 43a are elevations of a spacing comb with sections of warp threads in it, taken at the fell and projected from Figures 41, 42 and 43, respectively.
Figure 41B:
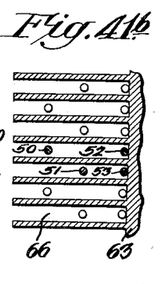
Figures 41b, 42b and 43b are fragmentary sectional elevations through the reed and taken upon lines 41b—41b, 42b—42b, 43b—43b of Figures 41, 42 and 43, respectively, the views being projected from these figures.
Figures 42, 42A:
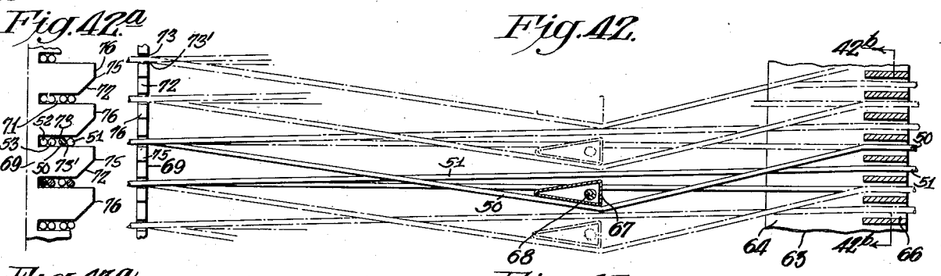
Figure 42B:
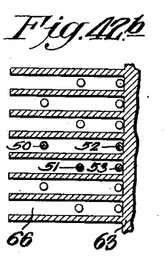

Between the positions of Figure 41a and Figure 42a the comb has been shifted across the warp threads so that the comb occupies a slightly different position in Figure 42a with respect to the reed in Figures 41b and 42b as compared with the position of the comb in Figure 41a. The difference in these two positions is just enough to start the warp threads which rest upon the ends of the teeth down the sloping surfaces 72 so as to deposit them in the upper parts of the slots in Figure 42a.

As will be seen in Figure 41, the separation of the warp threads into groups of four at the comb gives space between them for the insertion of an operating tool. In the form illustrated in these figures, this space is not immediately used for this purpose but is used ultimately to permit the tuft carrying tool to emerge upwardly through the shed near the end of the cycle of operation, while the warp threads of the pair are crossed as seen in Figure 45. In the form of the invention illustrated in these figures the separation at the fell is used to give a lesser separation at the point where the tuft carrying tubes pass down through the upper shed level from above. This position is seen in Figure 41. Though the separation is less at this point than at the fell, it is still sufficient for the tuft-thread-carrying tubes 67 to reliably pass between the proper warp threads.

Figures 12, 13:
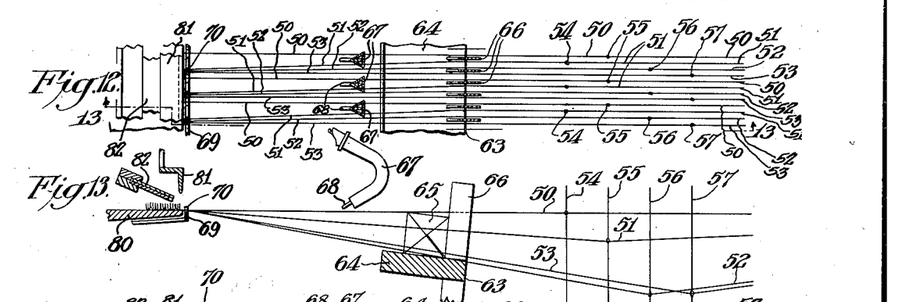
Figure 12 is a diagrammatic plan view of a portion of loom essentials arranged in their proper relations to carry out our invention, except that three warp threads for clearness are shown as side by side at the comb close to the fell, instead of in vertical line, and showing a tuft yarn introduction tube positioned as at the beginning of a cycle of operation.
Figure 13 is a section taken on line 13—13 of Figure 12.
Figures 14, 15, 16:
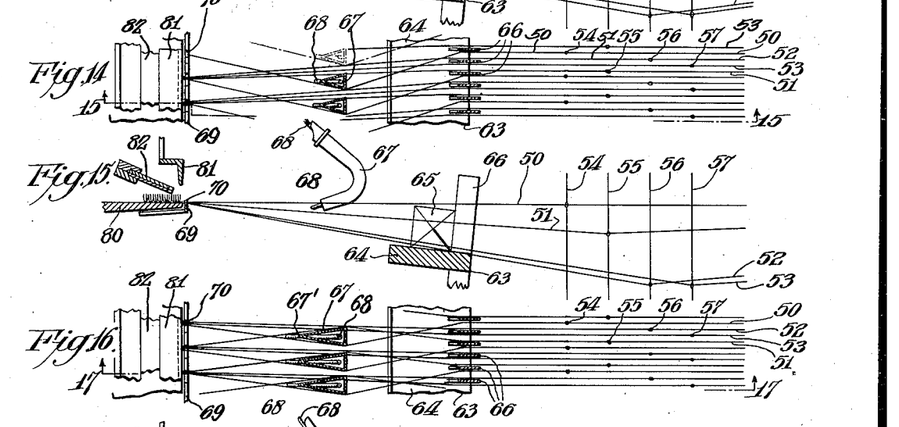
Figure 14 is a view similar to Figure 12 showing the second step of the cycle of operation.
Figure 15 is a section taken on line 15—15 of Figure 14.
Figure 16 is a view similar to Figure 12 showing the third step of the cycle.
Figures 17, 18, 19:
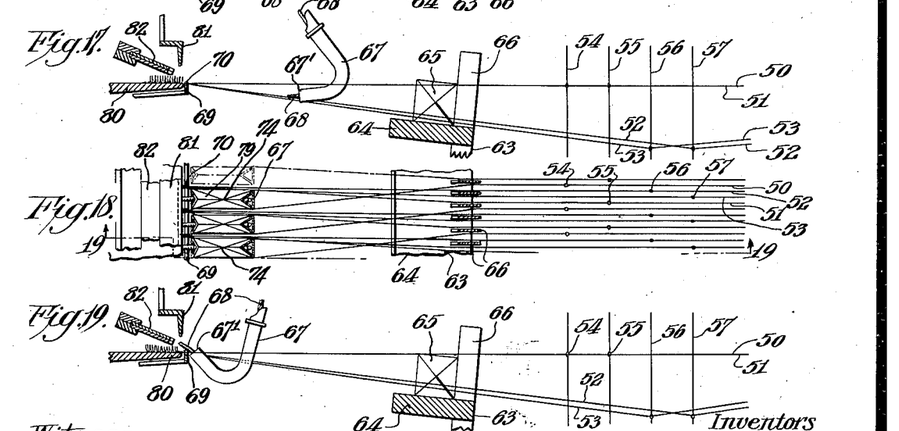
Figure 17 is a section taken on line 17—17 of Figure 16.
Figure 18 is a view similar to Figure 12 showing the fourth step of the cycle.
Figure 19 is a section taken on line 19—19 of Figure 18.
Figures 20, 21, 22:
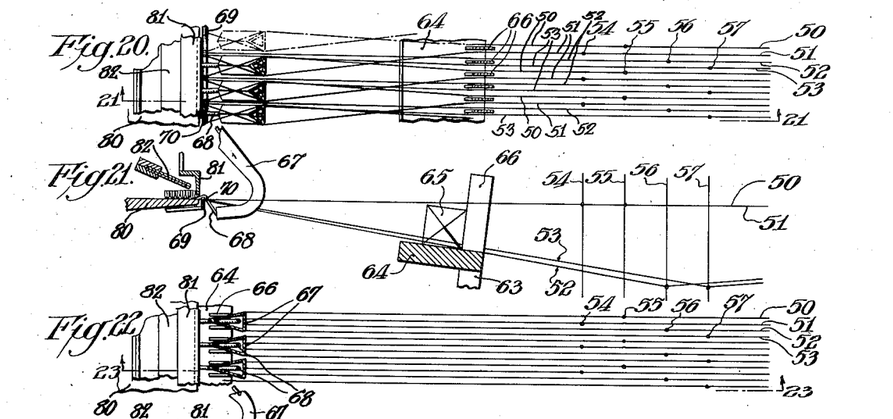
Figure 20 is a view similar to Figure 12 showing the fifth step of the cycle.
Figure 21 is a section taken on line 21—21 of Figure 20.
Figure 22 is a view similar to Figure 12 showing the sixth step of the cycle.
Figures 23, 24:
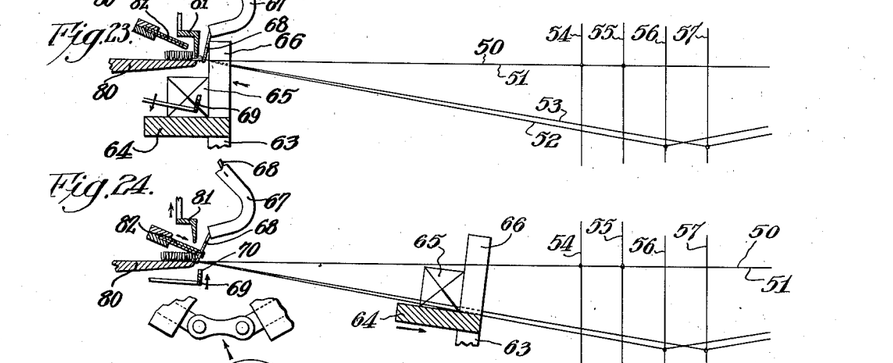
Figure 23 is a section taken on line 23—23 of Figure 22.
Figure 24 is a sectional view similar to Figure 23 showing the seventh step of the cycle of operation. A corresponding plan view is omitted because it would be practically a duplication of Figure 22.
Figure 25:
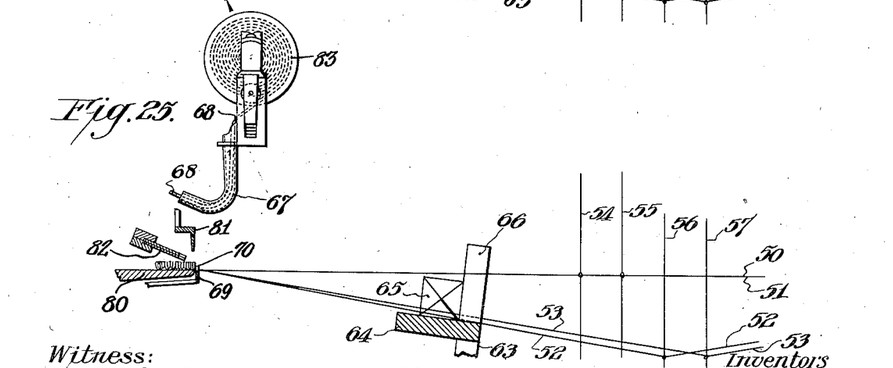
Figure 25 is a section similar to Figure 23 showing the eighth step of the cycle and additional structure.
Figures 43, 43A:
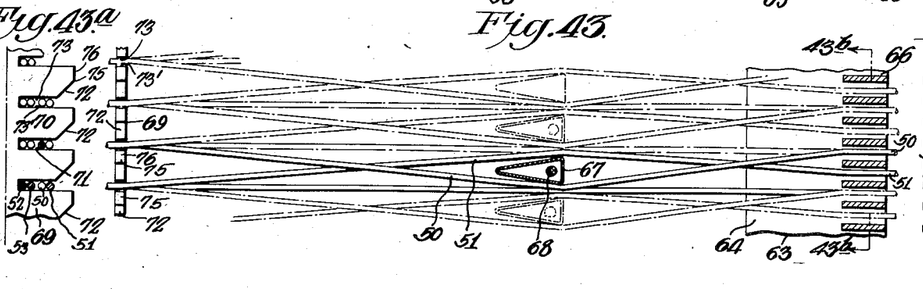
Figure 43B:
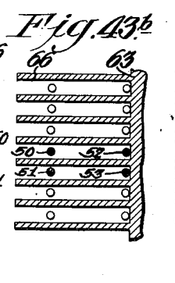

By suitable means for shifting an Axminster tube carrier, shown in part in Figure 25, the tube is given movements illustrated in the figures as follows:

With the warp threads of the active pairs of warp threads separated within each pair into slightly different (vertical) shed level positions, as shown in Figure 13, the tube 67 is dipped beneath the upper of these warp shed positions, as seen in Figures 14 and 15, to a position where lateral movement of the end of the tube passes warp thread 50 over warp thread 51 toward the observer in Figures 15 and 42. The tube is then progressed further through the shed to pass on the side toward the observer of warp thread 51 and is then depressed further and given lateral movement to carry warp thread 51 away from the observer until the tube is central between the crossed warp threads of the pair. This position is shown in Figures 16, 17 and 43. The tube is then advanced toward the fell and at the same time is rotated so that it not only pushes the crossing point of the warp threads toward the fell, but lifts the nose 67' of the tube up beyond the crossing point 74 through the space 79 between the warp threads. The tuft end 68 passes beyond the comb 69 to a point where it can be clamped between bed 80 and clamp 81. The clamp position is shown in Figures 20 and 21 for the first pairs or sets. In these Figures 20 and 21 the tube has been turned slightly in a counter-clockwise direction as compared with the position in Figures 18 and 19. The tube is then lifted to the position shown in Figures 22 and 23 so that the tufts may be cut by knife 82 as in Figure 24. During the several operations the tuft yarn 68 remains attached to the tufting yarn upon spool 83 and is held by any suitable spring retardation against freely paying out. As a result, from the time that the end of tuft yarn 68 is clamped at the fell both ends of the tuft are effectively held up to the time of cutting of the tuft. The tufts may be beaten up during the time they are held, as shown in Figures 22 and 23, or not as may be expedient in the individual case. We prefer to beat up the tufts or knots for each shed position before the tuft thread is cut, beating the tuftings of the first alternate pairs or sets of warp threads before the tufts are inserted in the other or second alternate pairs or sets of warp threads and shooting in the weft material after the beating up of the last inserted tufts by which a row of tufts is completed about all of the warp threads. This is permissible by whatever means the tufts are inserted and is much the more desirable when the means or methods of tuft insertion permit holding on to the tuft material until the tufts can be beaten up before cutting the tuft ends. The tufts may be made much more regular in length and position in this way than is possible where the tufts are cut before they are finally positioned; and particularly so where the tufts are cut from the tufting material at a considerable distance from the fell.

Figure 26:
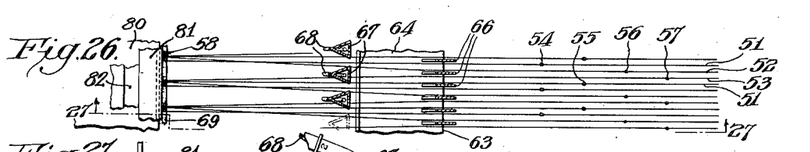
Figure 26 is a plan view similar to Figure 12 showing the tuft yarn tube positioned for a repetition of the cycle illustrated in Figures 12 to 25 inclusive, but having been moved laterally to now operate upon the pairs of warp threads previously held idle.
Figures 27, 28, 29:
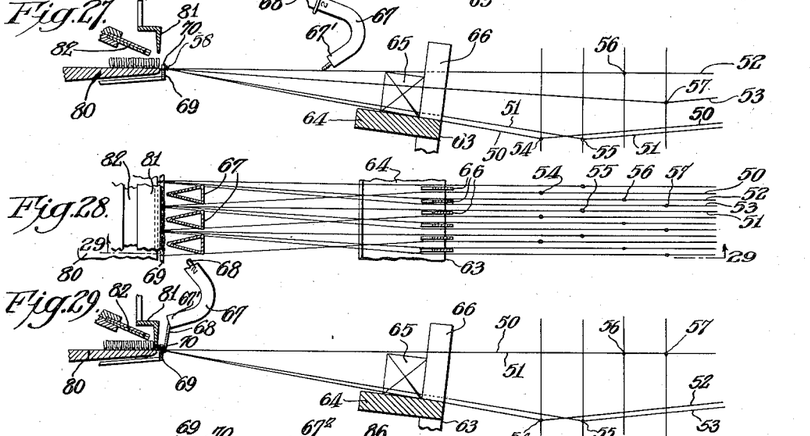
Figure 27 is a section taken on line 27—27 of Figure 26, and corresponds to Figure 13, the difference being in the position of the heddles and the warp threads.
Figure 28 is a plan view similar to Figure 22, the difference being in the warp threads operated on, and the lay and reeds are here shown in their rest position and not in their beating up position as in Figure 22.
Figure 29 is a section taken on line 29—29 of Figure 28.

Figures 26 and 27 are inserted for the purpose merely of indicating that the method and mechanism of inserting the tufts may be the same for each succeeding alternation of pairs or sets of tuft yarn, as for the first formation of pairs or sets of tuft yarn for which tuft insertion has been illustrated in Figures 12 to 25. With the tufts inserted in one series of alternate pairs or sets of warp threads, as at the left in Figure 5, the insertion of tufts of an intermediate series of pairs or sets of tuft yarn proceeds as in the first tuft insertion, the tufts being placed as at the right in Figure 5 and progressed to position and beaten up into position corresponding with the position of the intervening tuft 60, seen in Figure 6.

Except that the positions of the tubes are different, that is, laterally displaced with respect to the warp threads to act upon differently spaced pairs of warp threads in Figure 26 from those acted upon in Figure 12 and that alternate tufts are in position at the left in Figure 26, placed there in the operations shown in the preceding figures, these two Figures 12 and 26 correspond. Figure 27 corresponds generally with Figure 13 with the same exception that the tufts previously inserted appear in Figure 27.

Figures 28 and 29 correspond generally with Figures 22 and 23 except that the dents are in different position in Figures 28 and 29, showing their position after the beating up has been effected.

It has not been considered necessary to show the intermediate positions in the process of weaving.

Figures 30 to 33 differ from the corresponding figures in the set from 12 to 24 in that a standard Axminster tube is illustrated at 67' in cooperation with grippers 84 that pass down between the warp threads to engage the tuft yarn 68, and that the tubes are not used to effect the crossing of the warp threads which are crossed, instead, by pins 85 carried by a bar 86. However, a straight tube is used to cross the warp threads in Figures 35 and 36.

Figures 30, 31, 32:
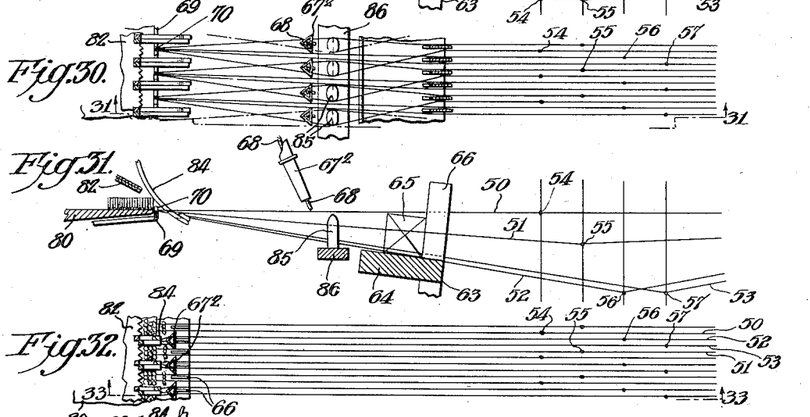
Figure 30 is a plan view of a modified form wherein the tuft yarn is introduced through a straight Axminster tube, the warp threads are manipulated longitudinally by devices other than the tubes, and the tuft yarns are drawn between the warp threads by grippers, the various parts being positioned as near the beginning of a cycle of operation.
Figure 31 is a section taken on line 31—31 of Figure 30.
Figure 32 is a plan view similar to Figure 30, illustrating the completion of the cycle of operation started in Figures 30 and 31, and showing the tuft knots being beaten up.

Figures 30 and 31 correspond generally with Figures 12 and 13 in that they show the beginning of a cycle; from another standpoint, namely, that the device which is to cross the warp threads is in position Figure 31, they might be said to correspond with Figure 15.

The pins 85 may lie within the warp threads at all times ready for warp crossing, the engagement or non-engagement of the warp threads of the active shed by the pins being determined preferably by the position of the heddles so as to bring one or both of the warp threads of a pair within the range of movement of a pin which is to engage them.

The operation of shifting the warp threads is quite similar to that in the previous figures, one warp thread of each pair for distinction here called the first warp thread, being laterally shifted to an excessive extent before the other (second) warp thread of each pair is brought into position to be engaged by the corresponding pin or the pin is lifted so as to be brought into engagement with the second warp thread, and this second warp thread is carried part way back (when the pin is shifted back laterally) to an intermediate position. With the warp threads crossed the tube and gripper are shifted to a position where the gripper engages the end of the tuft yarn beneath the crossing and the gripper is then withdrawn to the position shown in Figure 33 where the end of the tuft yarn is held by it, the tube meantime being used to shift the crossing point up close to the fell and to then lift the tube out of the warp threads to the position shown also in Figure 33. Room for insertion of the grippers is given, close to the fell, by operation of the comb, as in Figures 41–43.

Figure 33:
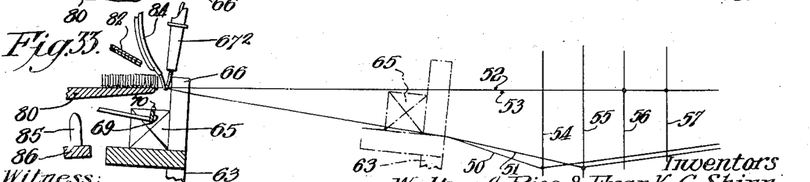
Figure 33 is a section taken on line 33—33 of Figure 32.

The pins 85 and their supports 86 are shifted out of place to permit beating up as seen in this Figure 33.

Figure 34:
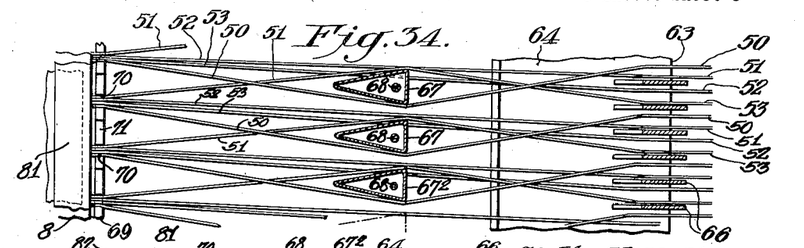
Figure 34 is an enlarged detail of the elements shown in Figure 16.

In Figure 34 is shown an enlargement of the position seen in Figure 14, when one of the warp threads of each pair has been shifted across the other to a distance sufficient for the tube to engage the opposite side of the other warp thread but before the tube has shifted the other warp thread back to an intermediate or neutral tube position. This is seen also in Figure 42.

Figure 35:
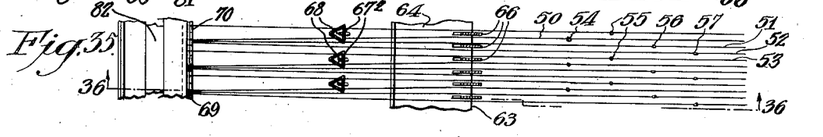
Figure 35 is a plan view similar to Figure 12 but showing the tube inserted within the warp thread and the warp thread manipulation being effected by a straight Axminster tube.
Figures 36, 37:
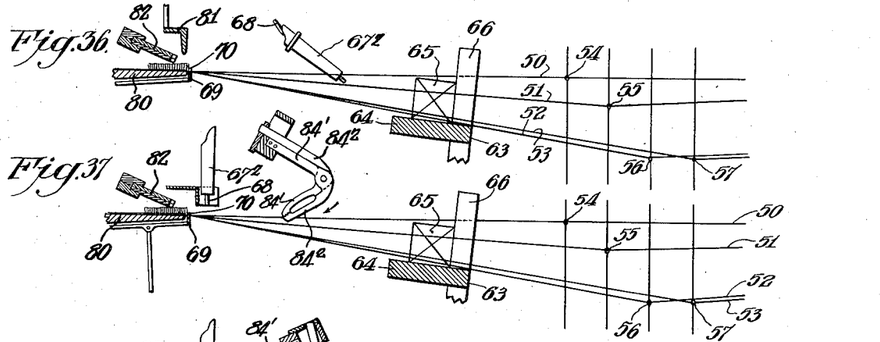
Figure 36 is a section taken on line 36—36 of Figure 35.
Figures 37, 38, 39 and 40 are sectional views taken at points corresponding to Figures 15, 17, 19 and 21, respectively, and illustrating gripper operation in place of tube operation through a path similar to that of the tubes in the corresponding figures of the group 12 to 29 inclusive.

In Figures 35 and 36 a straight tube 67' is shown in conjunction with apparatus of the character of that of Figures 14 and 15. In place of the bend of the tube a different tube movement is given, tilting the tube further and lifting the tuft yarn at the crossing by the tube in order that the tube may deliver the tuft end in the position for clamping. Here the tube is intended to cooperate with a gripper (not shown) of the general character of that seen in Figures 30 and 31.

Figures 38, 39, 40:
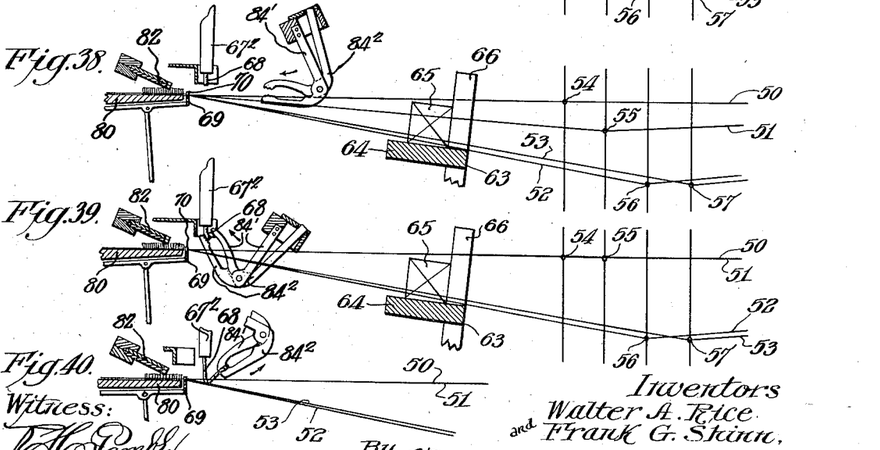

In Figures 37, 38 and 39 the places of the tube and grippers of Figures 31–33 are reversed and grippers 84, 84 are used in the position of the tubes of Figures 12 to 29 to not only carry tuft yarn through the warp threads, but to effect the crossing of the warp threads and to deliver the tuft yarn above the warp threads and on the opposite side of the crossing. However, in this instance the tuft thread is carried initially close to the fell by tube 67² and is not engaged by the grippers until the latter have effected the crossing of the warp threads and have emerged from an intermediate position beneath the warp threads to grasp the end of the tuft yarn. The tuft yarn is thus passed from a point forward of the crossing down beneath the warp threads and up again at a point back of the crossing. The grippers are moved toward the fell to shove the crossing point of the warp threads close to the fell before the grippers merge with the end of the tuft yarn in a position close to the fell.

It will be evident that the term "shedding" and the term "shed" have been used in the specification and in the claims not only to refer to the shedding and shed between warp threads of the same alternate pairs, one thread of the pair being placed at a different level from the other thread of the pair and thus giving room for lateral displacement of one thread with respect to the other in each pair so as to cross the threads of the individual pairs but has been used also to distinguish between the active pairs which are being operated upon and are thus in an upper position and the alternate idle pairs which lie at a lower level than the active or operating pairs.

In view of our invention and disclosure variations and modifications to meet individual whim or particular need will doubtless become evident to others skilled in the art, to obtain part or all of the benefits of our invention without copying the structure shown, and we, therefore, claim all such in so far as they fall within the reasonable spirit and scope of our invention.

Having thus described our invention, what we claim as new and desire to secure by Letters Patent is:

1. The method of forming pile fabric, which consists in dividing adjoining sets of warp threads into two distinct warp groups in different shed levels one above the other for shedding purposes, one set being in active knotting position and the other being in idle position, and in forming loops or knots about the sets of warp threads in the knotting position, by manipulation from the front of the fabric for successively tufting or knotting the warp threads in successive shifts into active position until all of the warp threads have loops or knots formed thereon, the separation space between the pairs of sets treated at the same time being utilized for laterally crossing the warp threads of each set, one set with respect to the other, from above preliminary to the knotting operations.

2. The method of forming pile fabric, which consists in dividing adjoining pairs or warp threads into two distinct warp groups in different shed levels one above the other for shedding purposes, the threads of one pair being in active position to be operated upon and the other being in idle position, in forming loops or knots by manipulation from the front face of the fabric about pairs of warp threads in the operating position, for successively tufting or knotting the warp threads, in successive shifts into active level position, until all of the warp threads have loops or knots formed thereon, in utilizing the separation space between the pairs or sets treated at the same time for laterally crossing the warp threads of each pair preliminary to the knotting operations, inserting weft between the pairs of warp threads in successive cycles, and beating up the loops or knots by the dents of the loom for each cycle after insertion of the weft.

3. The method of forming pile fabric, which consists in dividing adjoining pairs of warp threads into two distinct warp groups in different shed levels one above the other for shedding purposes, one shed level being in position to be operated upon and the other being in idle position, in forming loops or knots by manipulation from the front face of the fabric about pairs of warp threads in the operating position, for successively tufting or knotting the warp threads in successive shifts into active position until all of the warp threads have loops or knots formed thereon, in utilizing the separation space between the pairs treated at the same time for laterally crossing the warp threads of each pair or set preliminary to the knotting operations and for the knotting operation, in inserting weft between the pairs or sets of warp threads, in successive cycles, and in beating up the loops or knots by the dents of the loom for each cycle after the insertion of tufts or knots in each shed position.

4. The method of making tufted fabric, which consists in so shedding the warp threads into different shed levels, one above the other as to bring alternate pairs of warp threads into positions for tufting within the individual pairs and the intervening pairs into idle postions respectively, for one operation, and in reverse position for tufting the previously idle pairs, successively, so as to tuft all of the pairs and to provide extra lateral space adjoining each pair while it is in tufting position during the tufting operation, in crossing the warp threads being tufted as a part of the operation of inserting the tuft by drawing one of the threads of each warp pair laterally across the other into the extra space provided and in part laterally releasing the one so drawn while shifting the other warp thread of each pair in a reverse direction to form and hold the warp threads in crossed position, inserting the tufting material while the warp threads are crossed, in forcing the point of crossing toward the fell to complete the tufting in closer proximity to the fell than the point at which the warp threads were crossed, releasing the crossed threads, completing the operation for each set of warp threads and inserting weft, the completed row of tuft ends being beaten up for each cycle.

5. The method of making tufted fabric, which consists in so shedding the warp threads as to bring alternate pairs of warp threads into positions in different shed levels one above the other for tufting within the individual pairs and the intervening pairs into idle positions respectively, for one operation, and in reverse position for tufting the previously idle pairs, successively, so as to tuft all of the pairs and to provide extra lateral space adjoining each pair while it is in tufting position during the tufting operation, in crossing the warp threads in the individual pairs, one thread with respect to the other being tufted as a part of the operation of inserting the tuft, by drawing one of the threads of each warp pair laterally across the other into the extra space provided and in part laterally releasing the one so drawn while shifting the other warp thread of each pair in a reverse direction to form and hold the warp threads in crossed position, in inserting the tufting material while the warp threads are crossed, in forcing the point of crossing toward the fell to complete the tufting in closer proximity to the fell than the point at which the warp threads were crossed, in releasing the crossings, completing the operation for each set of warp threads and inserting weft, the completed shot or row of tuft ends being beaten up after the insertion of tufts in each shed position.

6. The method of making tufted fabric, which consists in so shedding the warp threads as to bring alternate pairs of warp threads into positions in different shed levels one above the other for tufting within the individual pairs and intervening pairs into idle positions respectively, for one operation, and in reverse position for tufting the previously idle pairs, successively, so as to tuft all of the pairs and to provide extra lateral space adjoining each pair in tufting position during the tufting operation, in laterally crossing the warp threads being tufted, one thread of a pair with respect to its other pair thread as a part of the operation of inserting the tuft by drawing one of the threads of each warp pair laterally across the other into the extra space provided and in part laterally releasing the one so drawn while shifting the other warp thread of each pair in a reverse direction to form and hold the warp threads in crossed position, in inserting the tufting material while the warp threads are crossed, in forcing the point of crossing toward the fell to complete the tufting in closer proximity to the fell than the point at which the warp threads were crossed, in releasing the crossings, completing the operation for each set of warp threads and inserting weft, the completed row of tuft ends being beaten up after the insertion of tufts in each shed position and before the tuft is cut from the supply of tufting material.

7. The method of forming tufted fabrics which consists in forming the warp into shed levels in which alternate pairs of warp threads lie in an upper shed for active operation and in lower shed idle positions, in laterally crossing the threads of the alternate pairs in the active position, one thread of each pair with respect to its mate, in introducing loops or knots of tuft yarn beneath the crossing, from one end thereof to the other while the warp threads of the alternate pairs are in crossed position, in releasing the crossings to form knots, in shifting idle pairs of warp threads to the upper shed position and the intervening pairs of warp threads previously acted upon to idle position, in repeating the operation upon the intervening alternate pairs of warp threads, in inserting weft, in beating up the weft and in repeating the operation for successive rows of tufts, the crossing point of the warp being forced toward the fell during insertion of the tufts, and thus delivering the knots substantially at the fell.

8. The method of forming tufted fabrics which consists in forming the warp into shed levels in which alternate pairs of warp threads lie in an upper shed for active operations and in lower shed idle positions, in laterally crossing the threads of the alternate pairs in the active position, one thread of each pair with respect to its mate, in introducing loops or knots of tuft yarn beneath the crossing, from one end thereof to the other while the warp threads of the alternate pairs are in crossed position, in releasing the crossings to form knots, in shifting idle pairs of warp threads to the upper shed position and the intervening pairs of warp threads previously acted upon to idle position, in repeating the operation upon the intervening alternate pairs of warp threads, in inserting weft, in beating up the weft and in repeating the operation for successive rows of tufts, the crossing points of the warp threads being forced toward the fell during insertion of the tufts, thus delivering the knots substantially at the fell and the tuft yarn being held by an end while it is being beaten up.

9. The method of forming knots on closely spaced warp threads which consists in shedding alternate pairs of warp threads into one shed level and placing the warp threads of intervening pairs in idle position at a different shed level so as to leave spaces between alternate pairs in the same working shed, in laterally crossing the threads of each alternate individual pair, one thread with respect to the other by engaging one of the threads of the pair and carrying it over into the space provided by the removal of the idle warp threads, engaging the other warp thread of each pair to move it in the opposite direction from that in which the first warp thread of the pair was moved while partly laterally releasing the first warp thread of the pair so that the crossing point will be at a middle point between the warp threads of the pair, inserting a tufting material across from one end of the crossing to the other and forming a knot by releasing the warp threads from their crossings.

10. The method of forming knots on closely spaced warp threads which consists in shedding alternate pairs of warp threads to different shed levels, one above the other, placing the warp threads of intervening pairs in idle position so as to leave spaces between alternate pairs in the same working shed, in laterally crossing the threads of each alternate individual pair by engaging one of the threads from each pair and carrying it over the other and into the space provided by the removal of the idle warp thread shed, engaging the other warp thread of each pair to move it in the opposite direction from that in which the first warp thread of the pair was moved while partly laterally releasing the first thread of the pair, so that the crossing point will be at a middle point between the warp threads of the pair, inserting a tufting material under the crossing, from the back of the crossing to the front of the crossing, forming a knot by releasing the warp threads from their crossings, maintaining a hold upon the ends of the tuft while bringing the knot up to the fell, reversing the positions of the pairs to bring the idle warp threads into working warp positions, and the intervening warp threads into idle positions, repeating the operation of inserting tufts, inserting weft material and beating up the two sets of knots and the weft material.

11. The method of forming knots on closely spaced warp threads which consists in shedding alternate pairs of warp threads to different shed levels, one above the other, placing the warp threads of intervening pairs in idle position so as to leave spaces between alternate pairs in the same working shed, in laterally crossing the threads of each alternate individual pair, one thread with respect to the other by engaging one of the pair and carrying it over into the space provided by the removal of the idle warp thread shed, engaging the other warp thread of each pair to move it in the opposite direction from that in which the first warp thread of the pair was moved while partly laterally releasing the first thread of the pair so that the crossing point will be at a middle point between the warp threads of a pair, inserting a tufting material across from one end of the crossing to the other, forming a knot by releasing the warp threads from their crossings, shifting the crossing point toward the fell, releasing the crossing and holding both ends of the tufting material while beating up the tuft.

12. The method of forming knots on closely spaced warp threads which consists in shedding alternate pairs of warp threads to different shed levels, one above the other, placing the warp threads of intervening pairs in idle position so as to leave spaces between alternate pairs in the same working shed, in laterally crossing the threads of each alternate individual pair, one thread with respect to the other by engaging one of the threads of the pair and carrying it over into the space provided by the removal of the idle warp thread shed, engaging the other warp thread of each pair to move it in the opposite direction to that in which the first warp thread of the pair was moved while partly laterally releasing the first warp thread of each pair so that the crossing point will be at a middle point between the warp threads of a pair, inserting tufting material beneath the crossing from one end of the crossing to the other, in transferring the crossing point close to the fell and subsequently releasing the crossing, keeping the dents in the warps at all times, and beating up the knots.

13. The method of forming knots on closely spaced warp threads which consists in shedding the warp threads in alternate pairs of warp threads to different shed levels, one above the other, placing the warp threads of intervening pairs in idle position so as to leave spaces between the alternate pairs in the same working shed, in laterally crossing the threads of each alternate individual pair, one thread with respect to the other, by engaging one of the threads of each pair and carrying it past the other into the space provided by the removal of the idle warp thread shed, engaging the other warp thread of each pair to move it in the opposite direction to that in which the first warp thread of the pair was moved while partly laterally releasing the first thread of the pair so that the crossing point will be at a middle point between the warp threads of a pair, in inserting tufting material across beneath the crossing from one end of the crossing to the other, in transferring the crossing point close to the fell, in laterally releasing the crossing, while keeping the reed wires in the warps at all times, in beating up the knots, in reshedding to bring the idle warp threads into the active shed position, in repeating the operation, in inserting weft and again beating up the knots and the weft.

14. The method of forming a tufted fabric which consists in forming the warp threads of the fabric into active shed position and idle position having alternate sets of active warp threads in the shed and intervening idle sets in another position, in laterally crossing the threads of the individual active pairs, one thread of the pair with respect to the other, in forming loops or knots about the warp threads of the sets in the one level, in beating up the loops or knots so formed while holding the ends of the tufts or knots, in shifting the levels of the warp threads of the previously idle sets to active position, in inserting weft and in repeating the operation after the insertion of the weft after each two alternations of shed position and tuft insertion.

15. The method of weaving a tufted fabric which consists in forming a shed in the warp so as to place alternate pairs of warp threads, in active and idle shed positions at different levels, one shed being above the other respectively, the threads of the active pairs being shedded, in laterally crossing the warp threads in each of the pairs in the shed, one thread with respect to the other, inserting tufts from one end of the crossing to the other beneath the crossing point in each pair of warp threads, in advancing the crossing point toward the fell, in laterally releasing the warp threads and holding the tuft ends, allowing time to straighten and form a knot in each pair, in beating up the knot, in reversing the positions to make the warp threads of the idle position available for knot formation, in repeating the operation of the warp threads of the new shed, in inserting weft and beating it up and in repeating the cycle once for each row of shots.

16. The method of weaving a tufted fabric which consists in forming a shed in the warp threads so as to place alternate sets of warp threads in active and idle shed positions at different levels, one shed being above the other respectively, the threads of the active sets being shedded, in laterally crossing the warp threads of each pair, in passing tufting material between the warp threads in the active thread position on one side of the crossing, beneath the crossing and back on the opposite side longitudinally of the crossing point, in beating up the tufts so formed while holding the tuft ends, in reversing the positions, the threads previously shedded being placed in idle position and the previously idle threads being shedded, in treating the warp threads of the new shed, now reversed in position, in the same manner to form tufts in them and to beat up the tufts, in reversing the top and bottom shed positions, in passing weft through between the warp threads and in repeating the operations.

17. The method of weaving pile fabric, which consists in forming the warp threads with alternate pairs in a shed and the intermediate pairs in a shed lower level, in laterally crossing the warp threads in the shedded pairs, one with respect to the other in each pair, in inserting tuft yarns at the successive crossing points, entering from above on one side of the crossing point, passing the crossing point and coming out at the opposite side of the crossing point in each pair, in releasing the crossings, in holding the ends of the tuft yarns, in beating up the tufts while the ends are held, in reversing the shed to bring the intermediate pairs of warp threads into operating position, in repeating the operation upon the intermediate warp thread, crossing the warp threads, introducing the tuft yarns, releasing the crossings, holding the ends of the tufts and beating them up, in inserting weft through the shed and in repeating the operations of inserting tuft yarns and weft, the shed being reversed after weft insertion and before the next tuft introduction.

18. The method of weaving fabric, which consists in shifting the warp threads to different levels to form a shed including alternate pairs, the warp threads of the intervening pairs being shifted to idle position at a different shed level, in shifting one of the threads of each of the shedded pairs laterally to cross the adjoining warp thread, in bringing the warp threads of the shed to the same level, in introducing tuft yarns across the crossing points of the crossed warp threads lengthwise of the warp threads down from above on one side and bringing them out on the opposite side of the crossing points while maintaining the reed in the warp threads, in releasing the crossings of the warp threads, in holding the ends of the tuft yarns so introduced and at the same time beating up the tufts against the fell, in shifting the alternate pairs within which tufts have been so introduced to the idle position, and bringing the original idle pairs of warp threads up into shed positions, in repeating the operations upon these lower pairs of warp threads which have been performed upon the original top pairs of warps, in introducing weft or filling within the shed and in shifting the shed to combine the weft with the warp threads.

19. The method of weaving fabric, which consists in placing alternate pairs of warp threads in active and idle levels respectively, one above the other in shifting the active warp threads in pairs laterally, in opposite directions, one thread with respect to the other, to cross the adjoining warp threads, in bringing the active warp threads to the same level, in introducing tuft yarns across the crossing points of the pairs lengthwise of the warp threads putting them in through from above on one side and bringing them out on the opposite side of the crossing points, in laterally releasing the crossings, in holding the ends of the tufts so introduced and at the same time beating up the tufts against the fell, in shifting the alternate pairs within which tufts have been so introduced to the bottom idle part of the shed, and bringing the original inactive pairs of warp threads up into top shed positions, in repeating the operations upon these bottom pairs of warp threads previously inactive which have been performed upon the previously active pairs of warp threads, in introducing weft or filling within the shed and in shifting the warp threads to combine the weft with warp threads.

20. The method of forming a tufted fabric which consists in forming the warp threads of the fabric into a shed having alternate pairs of adjoining warp threads in one level of the shed and the intervening sets or pairs in the other level of the shed, in laterally crossing the threads of the individual pairs of warp threads in one level by shifting the threads in opposite directions, one over the other, in forming loops or knots about the warp threads of the pairs in the upper level, in beating up the knots or loops so formed, in reversing the levels of the warp thread pairs, in inserting knots or loops within the warp threads previously in the other level, in beating them up and inserting weft and in repeating the operation after the insertion of the weft after each two alternations of shed position and knot or loop insertion, maintaining the warp threads within the reed during the entire operation.

21. In the weaving of fabrics, the method which consists in shedding the warp threads to place alternate pairs of adjoining warp threads in the same warp thread level and the intervening pairs in another warp thread level, in laterally crossing the threads of the individual pairs of warp threads, in introducing loops or knots to form tufts within the warp threads of the upper warp thread level, in beating up these loops or knots, in subsequently introducing loops or knots to form tufts in the intervening pairs, all while the dents are left within the warp threads, in beating up the loops or knots in both groups of pairs in inserting weft and in repeating the operation.

22. The method of weaving pile fabric which consists in shedding the warp threads with alternate pairs in one level and the intermediate pairs in a lower level, in laterally crossing the warp threads in the pairs of the upper level, in inserting tuft yarns at the successive crossing points, entering from above on the back of the crossing point and coming out at the front of the crossing point, lengthwise of the warp threads, in each pair, in releasing the crossings, in holding the ends of the tuft yarns, in beating up the tufts while the ends are held, in reversing the shed to bring the intermediate pairs of warp threads into operating position, in crossing the latter warp threads, in introducing the tuft yarns holding the ends of the tuft yarns and beating them up, in inserting weft through the shed and in repeating the operations of shedding, crossing the warp threads within the pairs, inserting tuft yarns and weft with successively different warp threads in position to have tuft yarns applied to them.

23. The method of forming tufted fabrics, which consists in forming the warp threads into a shed in which alternate pairs of warp threads lie in the same general shed level, and the intervening pairs in a second shed level, in crossing the threads of alternate pairs in the first mentioned shed level, in inserting loops or knots of different yarns lengthwise from end to end of the crossings while the warp threads in this level are in crossed position, in releasing the crossings, in reversing the shed and in repeating the operation upon the intervening alternate pairs of warp threads, in inserting a weft shot, in beating up the shot and in repeating the operation for successive shots, with different relative directions of thread crossing so that the Persian knots inserted are right knots and left knots respectively in successive rows of tufts by reason of the differences of crossing direction.

24. The method of forming tufted fabrics, which consists in forming the warp threads into a shed in which alternates, each made up of a single warp thread and a pair of warp threads lie within the same general shed level in placing the intervening warp threads at a different shed level, in laterally crossing the single warp thread with respect to the pair of warp threads in the upper level of this shedded position, in inserting tufting material lengthwise between the crossed warp threads while the warp threads are in crossed position, in releasing the crossed warp threads to form knots having two warp threads in one part of the knot and a single warp thread in the other part of the knot, in repeating the operation upon intervening sets of warp threads, in inserting weft, in beating up the shot and in repeating the operation for successive shots.

25. The method of forming tufted fabrics, which consists in forming the warp threads into sheds in which groups of warp threads each made up of a single warp thread and a pair of warp threads lie within each of different shed levels, in laterally crossing the single warp thread with respect to the pair of warp threads in one shed position, in inserting tufting material lengthwise between the crossed warp threads while the warp threads are in crossed position, in releasing the crossed warp threads to form knots having two warp threads in one part of the knot and a single warp thread in the other part of the knot, in inserting a weft shot, in beating up the shot and in repeating the operation for successive shots, alternating the relative direction of thread crossing in different rows, so that the knots of successive rows inserted are rights and lefts respectively by reason of the different direction of movement.

26. The method of weaving a tufted fabric which consists in dividing the warp threads into pairs, separating alternating pairs from the intervening pairs in different shed levels, crossing the warp threads of alternating pairs, one thread with respect to the other in each pair, passing tuft yarn between the crossed warp threads under the crossing points and back between the threads and releasing the crossed warp threads to place knots upon pairs of warp threads at lateral intervals within the width of the fabric and in the same row across the fabric, in beating up the knots so formed while holding the tuft ends of the knots from above as they are beaten up, in changing the shed and similarly treating the intervening pairs of warp threads to place intermediate knots upon intervening individual pairs of warp threads, the knots being in the same course and in beating up these knots while holding the tuft ends of the knots from above, continuing the process until all of the pairs of warp threads have been provided with knots, in shedding the warp threads for induction of weft, in introducing weft within the shed, in beating up the weft thread and in repeating the operation.

WALTER A. RICE.
FRANK G. SHINN.